United States Patent [19]
Grace

[11] Patent Number: 4,778,092
[45] Date of Patent: Oct. 18, 1988

[54] VEHICLE ROOF RACK

[75] Inventor: Richard C. Grace, Westleigh, Australia

[73] Assignee: Unistrut International Corp., Wayne, Mich.

[21] Appl. No.: 868,885

[22] Filed: May 27, 1986

Related U.S. Application Data

[63] Continuation of Ser. No. 708,908, Mar. 4, 1985, abandoned.

[30] Foreign Application Priority Data

Mar. 28, 1984 [AU] Australia .............................. 26202/84

[51] Int. Cl.⁴ ............................................... B60R 9/00
[52] U.S. Cl. ..................... 224/331; 224/314; 224/322
[58] Field of Search ............... 224/225, 309, 314, 315, 224/320, 321, 322, 329, 331, 917

[56] References Cited

U.S. PATENT DOCUMENTS

| | | | |
|---|---|---|---|
| 3,261,520 | 7/1966 | Andersson | 224/331 X |
| 3,281,030 | 10/1966 | Gosswiller | 224/330 X |
| 3,381,866 | 5/1968 | Wickett | 224/331 |
| 3,677,451 | 7/1972 | Burland | 224/322 |
| 4,461,414 | 7/1984 | Gieber | 224/331 X |

FOREIGN PATENT DOCUMENTS 0141947 8/1983 Japan .................................. 224/309

Primary Examiner—Henry J. Recla
Assistant Examiner—David Voorhees
Attorney, Agent, or Firm—Gifford, Groh, VanOphem, Sheridan, Sprinkle and Dolgorukov

[57] ABSTRACT

A roof rack for a motor vehicle, the roof rack has a roof bar to extend transverse of the vehicle and a mounting assembly to secure the roof bar to the roof gutter of the vehicle, a mounting assembly secures the roof rack to the gutter by means of a gutter clamp which is moved both transverse of the vehicle and vertically relative to the gutter.

2 Claims, 2 Drawing Sheets

VEHICLE ROOF RACK

This is a continuation application of applicant Ser. No. 708,908 filed Mar. 4, 1985 and now abandoned.

FIELD OF THE INVENTION

The present invention relates to racks and more particularly to roof racks for motor vehicles.

BACKGROUND OF THE INVENTION

Although there are provided many forms of roof racks and roof bars for motor vehicles, these known racks or bars are generally unsuitable for heavy industrial use. Where roof racks or roof bars have been designed specifically for industrial use, these industrial racks or bars are not easily adapted to varying vehicle widths and are generally heavy and cumbersome.

SUMMARY OF THE INVENTION

It is the object of the present invention to overcome or substantially ameliorate the above disadvantages.

There is disclosed herein a motor vehicle roof rack comprising a roof bar to extend across the vehicle roof, a mounting assembly to be secured adjacent each end of the bar and adapted to engage a roof gutter of the vehicle, and wherein each mounting assembly includes a mounting bracket to engage the bar so as to extend downwardly therefrom and to have an extremity engageable within the roof gutter, a gutter clamp to be adjustably secured to the mounting bracket so as to be movable in a clamping action relaive thereto in a horizontal and vertical direction so as to sandwich the gutter between the gutter clamp and mounting bracket.

A preferred form of the present invention will now be described by way of example with reference to the accompany drawings wherein:

DETAILED DESCRIPTION OF THE INVENTION

Figure 1:
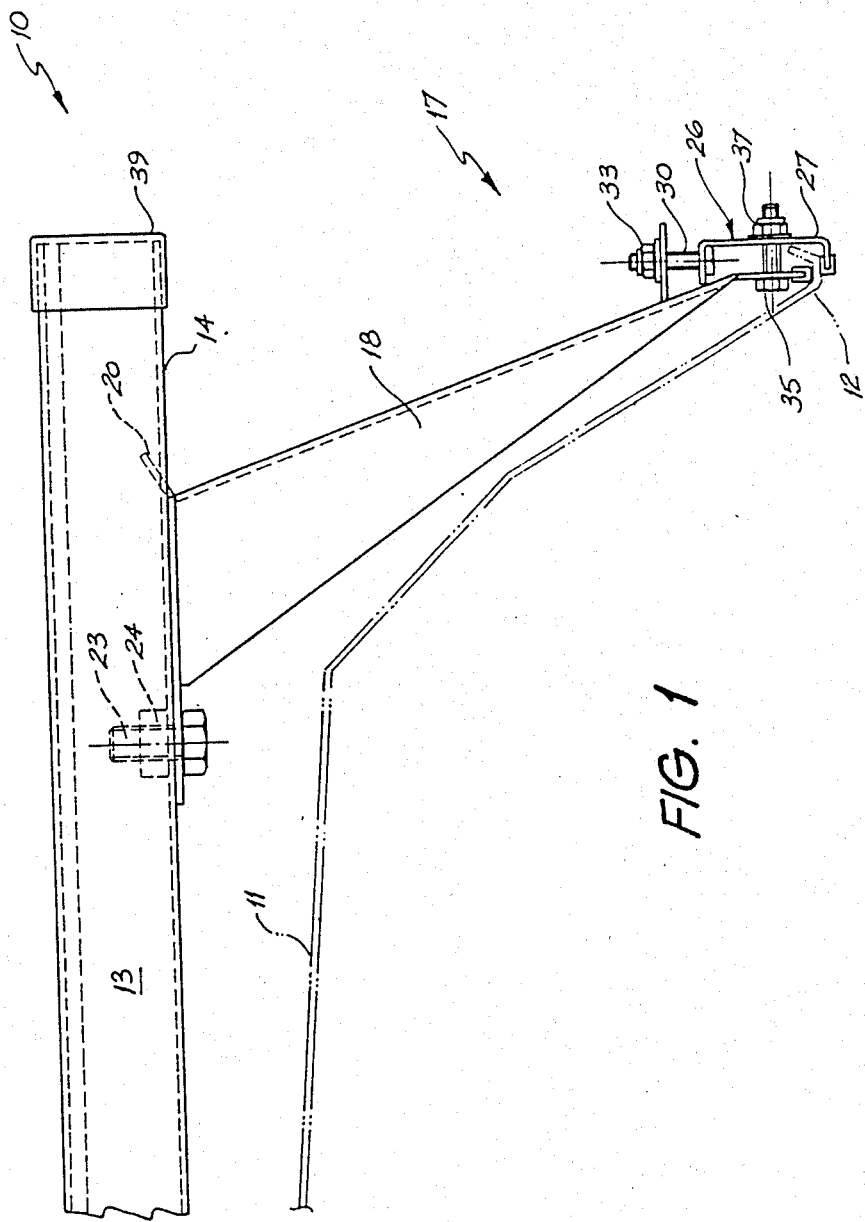
FIG. 1 is a schematic side elevation of one side of a roof rack for a motor vehicle.
Figure 2:
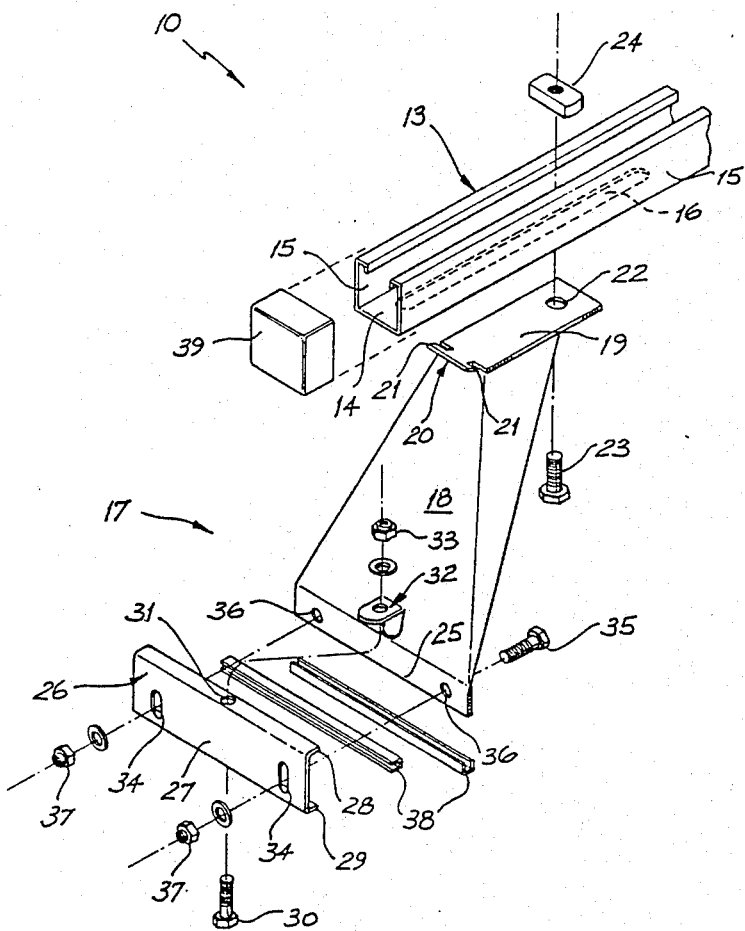
FIG. 2 is a schematic parts exploded perspective view of the roof rack portion of FIG. 1.

In FIG. 1 there is schematically depicted a roof rack 10 to be fixed to a motor vehicle having a roof 11 and a gutter 12. The roof rack 10 includes a roof bar 13 which is a channel member having a generaly U-shaped transverse cross-section so as to provide a base 14 and two sides 15. Formed in the base 14 at each end of the bar 13 is a slot 16.

To be fixed to each end of the bar 13 is a mounting assembly 17 which secures the bar 13 to the gutter 12. Each mounting assembly 17 includes a mounting bracket 18 which has an upper plate 19 with a T-shaped tongue 20. The tongue 20 is adapted to be inserted through the slot 16 by rotating the slot 16 through 90° relative to its normal direction of extension across the roof. Thereafter the T-shaped tongue 20 is passed through the slot 16 whereupon the roof bar 13 may be then rotated back to its normal direction of extension. In this position the two projections 21 of the tongue 20 are located on the interior surface of the base 14. Additionally, the plate 19 is provided with an aperture 22 through which a bolt 23 passes to engage a nut 24 also located on the interior of the roof bar 13. Upon tensioning of the bolt 23 the roof bar 13 is forced into frictional engagement with the plate 19 thereby fixingly securing the mounting bracket 18 to the bar 13.

The lower edge 25 of the mounting bracket 18 is adapted to be located within the gutter 12. Adapted to cooperate with the lower edge 25 is a gutter clamp 26 which is of a generally C-shaped transverse cross-section so as to have a base 27 and an upper and lower flange 28 and 29 respectively. The gutter clamp 26 is adapted to engage beneath the gutter 12 and brought into clamping engagement therewith by means of a bolt 30 which passes through an aperture 31 and en eyelet 32 to engage a lock nut 33. When the bolt 30 is tensioned the flange 29 is brought into clamping engagement with the lower surface of the gutter 12. To further secure the mounting bracket 18 to the gutter 12 there is provided a pair of apertures 34 through which bolts 35 pass via apertures 36 in the mounting bracket 18 to engage lock nuts 37. Upon the bolts 35 being tensioned the gutter clamp 26 is moved laterally towards the gutter 12 thereby further securing the mounting bracket 18 to the gutter 12.

To inhibit damaging of the vehicle gutter 12 there is provided two plastic strips 38 which engage the lower edge 25 of the mounting bracket 18 and the flange 29. To enhance the appearance of the rack 10 and further protect injury to people who may inadvertently bump the end of the bar 13, there is provided an end cap 39 which is fitted over the ends of the bar 13.

It should be appreciated that the slot 16 enables easy adjustment of the roof rack 10 to the width of the vehicle to which the rack is to be attached. Additionally, the transverse cross-section of the bar 13 enables fixing of various attachments to the bar 13 at desired space locations longitudinally of the bar 13. Securing these various attachments to the bar 13, a nut and bolt configuration similar to the nut 24 and bolt 23 could be provided to facilitate easy installation of these attachments to the bar 13. It should be particularly noted that the nut 24 has two diagonally opposite curved edges which allow limited rotation of the nut 24 within the bar 13. The nut 24 is also configured so as to be insertable in the bar 13 and engaged by a bolt so that upon rotation of the nut 24 the ends of the nut 24 will engage the sides 15 of the bar 13 thereby preventing any further rotation of the nut 24.

The claims defining the invention are claimed as follows:

1. A motor vehicle roof rack comprising a roof bar to extend across the vehicle roof, a mounting assembly to be secured adjacent each end of the bar and adapted to engage a roof gutter of the vehicle, and wherein each mounting assembly includes a mounting bracket mounted on the bar so as to extend downwardly therefrom and to have an extremity engageable within the roof gutter, a gutter clamp to be adjustably secured to the mounting bracket so as to be movable in a clamping action relative thereto in a horizontal and vertical direction so as to sandwich the gutter between the gutter clamp and mounting bracket; said gutter clamp having a vertical clamping engagement means for applying a vertical tension to a lower flange of said gutter clamp to engage said lower flange of said gutter clamp beneath said gutter to secure said roof rack to said vehicle and wherein each said mounting assembly includes means for lognitudinally moving said bracket on said bar so that the rack is adjustable to various width vehicles;

wherein said assembly is movable longitudinally of said bar for adjustment purposes by means of a slot being formed in said bar and with said mounting bracket being provided with a T-shaped tongue extending from one en thereof engaged with said bar through said slot and second means on said bracket for securing said mounting bracket to said bar, and being longitudinally spaced from said tongue on said mounting bracket.

2. The roof rack of claim 1 wherein said bar is of a channelled transverse cross-section enabling attachment thereto at the base locations there along of attachment members to enable the securing of objects of the roof rack.

* * * * *